Jan. 11, 1966  B. A. NAGLER  3,228,479
ROTARY WING AIRCRAFT
Filed May 27, 1963  4 Sheets-Sheet 1
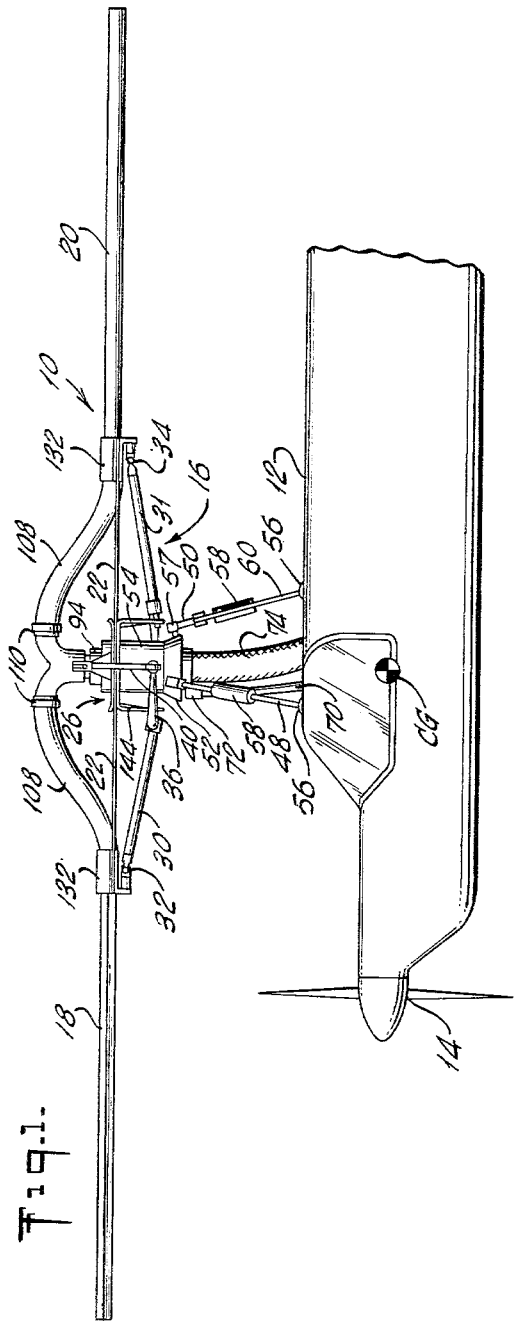
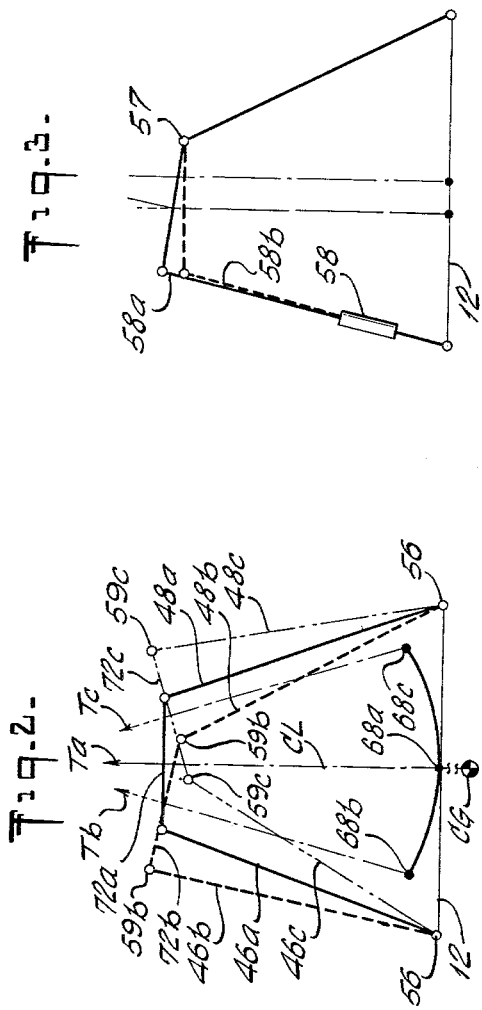
INVENTOR.
BRUNO A. NAGLER
BY
Nolte & Nolte
ATTORNEYS Jan. 11, 1966  B. A. NAGLER  3,228,479
ROTARY WING AIRCRAFT
Filed May 27, 1963 4 Sheets-Sheet 2
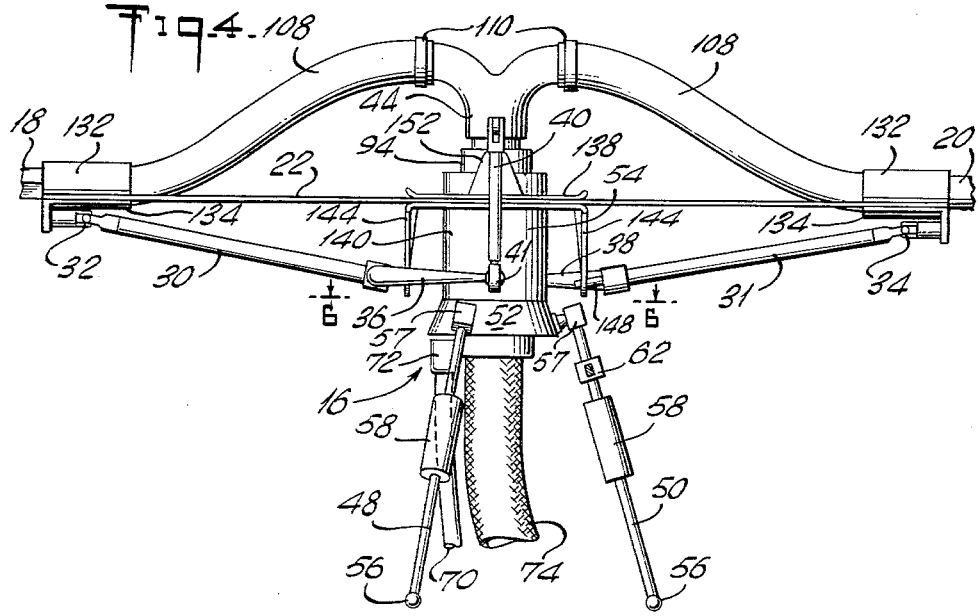
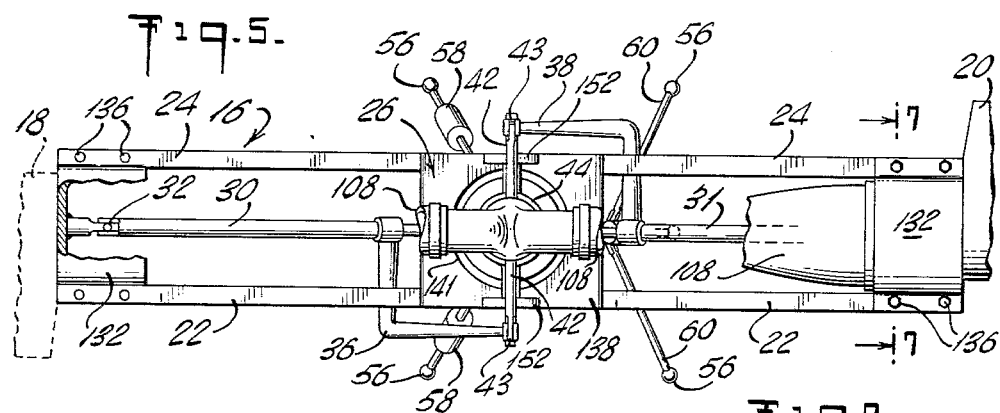
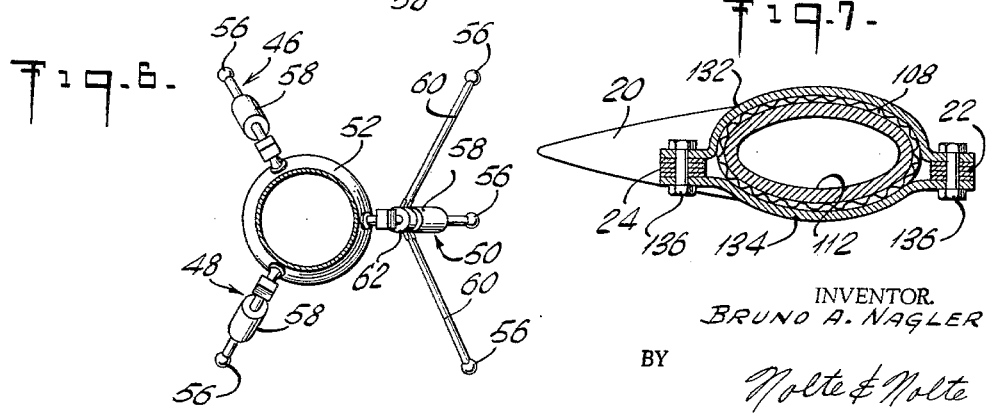
INVENTOR.
BRUNO A. NAGLER
BY
Nolte & Nolte
ATTORNEYS

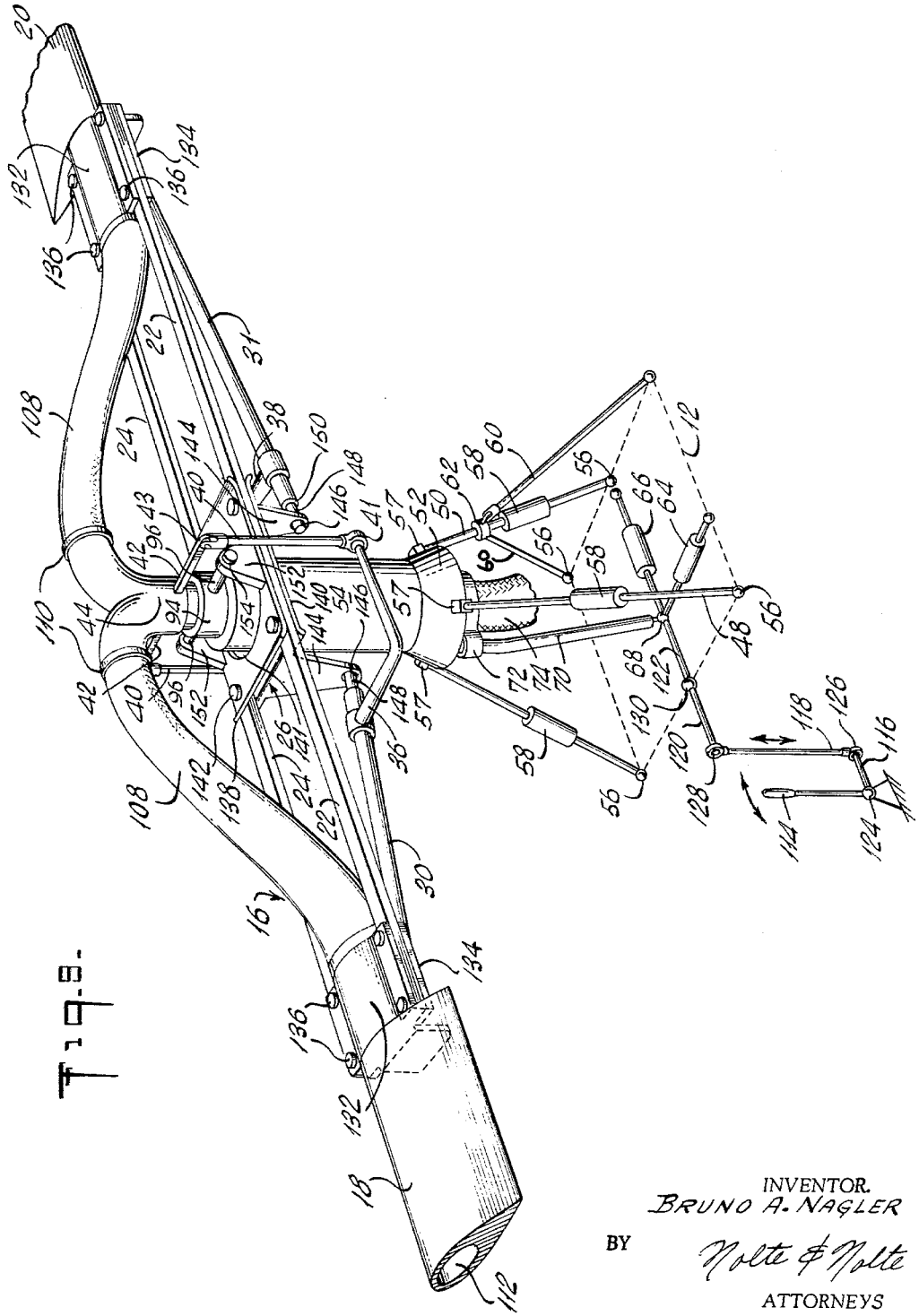

United States Patent Office 3,228,479
Patented Jan. 11, 1966

3,228,479
ROTARY WING AIRCRAFT
Bruno A. Nagler, Hotel Webster, 40 W. 45th St.,
New York 36, N.Y.
Filed May 27, 1963, Ser. No. 283,483
6 Claims. (Cl. 170—160.27)

The present invention relates to rotary wing aircraft, and in particular to such aircraft having apparatus to tilt the rotary wing thereby changing the direction of motion of the aircraft.

In rotary wing aircrafts, such as helicopters, changes in the direction of flight are accomplished by altering the plane of rotation of the rotor blades relative to the aircraft fuselage. The changed plane of rotation is effective to redirect the rotor's resultant thrust vector relative to the aircraft C.G. to thereby accomplish the desired change in the direction of flight.

Generally speaking, control of the plane of rotation of the rotor blades of a helicopter is accomplished by either one of two known techniques, namely "tilt control" or "cyclic control." In the tilt method, the plane of rotation of the rotor is altered by mechanically changing the physical orientation of the rotor pivot shaft with respect to the helicopter fuselage. In the cyclic pitch method of control, the rotor pivot support shaft remains fixed relative to the aircraft fuselage but the pitch of the individual rotor blades is altered during their rotational cycle to thereby control the plane of rotation of the blades relative to the fixed rotor pivot support axis. In either method the end result is the same in that the resultant thrust vector of the rotor blades is redirected relative to the aircraft C.G.

While the above described tilt method of rotor control has the obvious advantage of not requiring the mechanical complexity of the swash plate necessary in the cyclic pitch control technique, it has nevertheless not been adopted commercially to any great extent because of its requiring a complex universal joint for transmitting the input power to the rotor from a fuselage mounted engine. In contrast, because the cyclic pitch technique has a fixed axis rotor shaft, it does not require such a power transmitting univeral joint. For this reason the greater majority of helicopters in comercial use today obtain their maneuverability through exercise of cyclic pitch control rather than tilt control.

However, with the development of high performance lightweight gas turbines, it has become increasingly feasible to power the rotor blades by ducting the turbine gases directly to jet nozzles located at the rotor blade tips. This technique of rotor drive therefore obviously eliminates the need for heavy torque transmitting members from the engine to the rotor blades and accordingly the decision to employ tilt or cyclic control must be reevaluated.

Applicant's arrangement is accordingly primarily concerned with a novel form of tilt control helicopter employing novel support means for effecting changes in the rotor tilt. The invention includes a jet nozzle driven rotor supported by a unique multi-legged arrangement capable of imparting a controlled tilt to the rotor axis as well as a controlled shift of the rotor axis relative to the aircraft C.G. In this way the amount of change in the plane of rotation of the rotor required for a given amount of change in control force is substantially reduced because of the longitudinal or transverse shift of the entire rotor axis relative to the aircraft fuselage.

Another aspect of the present invention is the improved support means securing the rotor blades to the hub. The mounting includes a pair of laminated spring assemblies capable of considerable twisting freedom to allow for the desired collective pitch changes. Because this type of rotor support, at rest, would allow the blades to droop, the necessary collective pitch control mechanism operates in addition to prevent excessive drooping of the blades. It should be appreciated that the specific rotor mounting means is equally novel and applicable to cyclic control helicopters as well as tilt control helicopters.

Another inherent advantage of tilt control vs. cyclic control is the increased range of rotor blade pitch angles available for aircraft maneuvering because of the elimination of the need for cyclic pitch changes during blade rotation. The loading of cyclic control helicopters is critical because any displacement of the load from the aircraft C.G. requires a corresponding correction in the form of rotor blade cyclic pitch. Accordingly, any large cyclic pitch changes required of the rotor blades to compensate for load unbalance will limit the amount of maneuvering cyclic pitch control remaining available to the helicopter pilot because of the ultimate limitation of the stall angle of the rotor blades. This limitation just described is not present in tilt control helicopters because load unbalance is compensated for by the realignment of the entire rotor spin axis and not by cyclic control means.

It is therefore an object of the present invention to provide a rotary wing aircraft having apparatus for simultaneously tilting and shifting the rotor hub to thereby shift the rotor thrust vector relative to the fuselage.

It is another object of this invention to provide apparatus for simultaneously controlling the pitch of the rotor blades and the tilt of the rotary wings.

It is still another object of the present invention to provide a pitch shaft and stop for supporting the rotor blade when the rotor is stationary.

It is a further object of the present invention to provide support and connecting apparatus for connecting the rotor blades to each other and to the rotor hub.

Other and further objects of this invention will be apparent from the following description and claims and may be understood by reference to the accompanying drawing, which by way of illustration shows preferred embodiments of the invention and what is now considered to be the best mode of applying the principles thereof.

According to the invention a rotary wing aircraft may be driven by the rotation of rotor blades which are in turn driven by compressed fluid which is forced through jet nozzles at the end of the rotor blades, a passageway being provided in the blades for the passage therethrough of the fluid. The rotor blades are mounted on a rotor hub connected to a pylon and associated controls for tilting and simultaneously shifting the rotor hub laterally with respect to the fuselage of the aircraft, to thereby shift the thrust line from the air frame center of gravity, thus augmenting the moment of the rotor thrust. Merely tilting the rotor blades with relation to the fuselage would effect a change in the direction of movement of the aircraft by altering the direction of the rotor thrust. The present invention, however, provides a substantial increase in the change of the moment of the rotor thrust for the same amount of tilt by providing a specially designed pylon which cooperates with suitable actuators and tilt mechanism for producing a lateral shift of the pylon to which the rotor hub is secured, while simultaneously effecting the tilt of the same rotor hub. By augmenting the moment of the rotor thrust about the airframe C.G. through the utilization of the lateral shift of the rotor hub greater control is afforded the operator of the aircraft. The increased control, it should be noted, is brought about by structure which is relatively uncomplicated and therefore more economical to manufacture and maintain in operating condition.

Another feature of the present invention includes the use of leaf springs in cooperation with the rotor blades and the rotor hub and other associated apparatus to provide a convenient and practical means for the connection of the pitch adjustable rotor blades to the rotor hub which sustains the blades and provides conduit means for the passage of fluid to the rotor blades.

The various features of novelty which characterize the invention are pointed out with particularity in the claims annexed to and forming a part of the specification. For a better understanding of the invention, operating advantages and specific objects obtained by its use, reference should be had to the accompanying drawings and descriptive matter in which there is illustrated and described a preferred embodiment of the invention.

In the drawings:

FIG. 1 is a pictorial view of the rotary wing aircraft to which this invention is directed;

FIG. 2 is a schematic showing of a front view of the pylon in a plurality of operating positions;

FIG. 3 is a schematic showing of a side view of the pylon in two positions;

FIG. 4 is a side elevational view of a portion of the rotary wing aircraft of FIG. 1;

FIG. 5 is a top plan view of the apparatus of FIG. 4 with portions broken away;

FIG. 6 is a view taken along line 6—6 of FIG. 4;

FIG. 7 is a cross sectional view taken along line 7—7 of FIG. 5;

FIG. 9 is a perspective view of the rotor assembly of the present invention.

Figure 8:
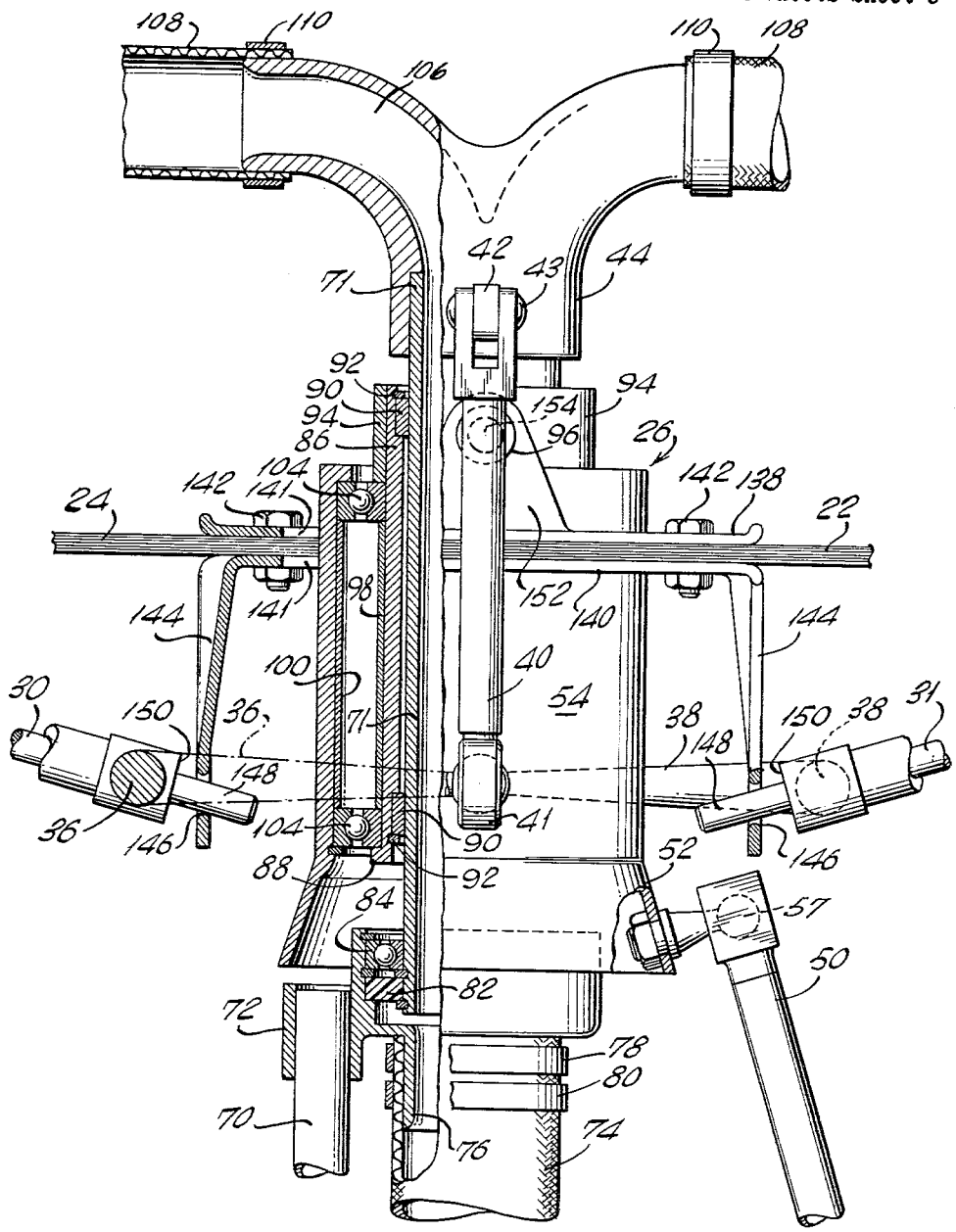
FIG. 8 is a side elevation view, partially in section of a rotor hub and connecting elements according to the present invention.

Referring now more in detail to the drawing wherein like reference numerals identify corresponding parts throughout the several views, the numeral 10 represents a rotary wing aircraft having a fuselage 12. The fuselage may or may not include engine and propeller 14 connected at the front for forward thrust. As envisioned, the provision of the engine 14 allows the operation of the aircraft in an autogyro mode, if desired, and also provides an auxiliary engine means for operating a compressor (not shown) for supplying fluid to the rotor blades. A rotor assembly 16 is shown connected to the fuselage and will be described more fully hereinbelow. The rotor system includes rotor blades 18 and 20 connected by a pair of laminated leaf springs 22 and 24 through a see-saw hinge assembly 26 to a cylindrical sleeve. Pitch shafts 30 and 31 are connected through universal joints 32 and 34 to the roots of the rotor blades 18 and 20 respectively. Pitch shafts 30 and 31, as seen more clearly in FIGS. 4 and 5 are connected to right-angled pitch horns 36 and 38 respectively which are in turn rotatably connected to pitch rods 40 at joints 41. Pitch rods 40 are rotatably connected through joints 43 to pitch levers 42, which in turn are fixedly secured to collar 44. A more detailed description of the control elements connected to collar 44 will be described more in detail below.

Front pylon struts 46 and 48 and rear pylon strut 50 are secured at their upper ends to outwardly flaring skirt 52 of rotor hub 54. The pylon struts are connected at their lower ends through ball joints 56 to the fuselage 12 of the rotary wing aircraft 10. The pylon struts 46, 48 and 50 include trim actuators 58 connected intermediate the struts. The trim actuators provide for the lengthening or shortening of the struts, as desired. It will be noted that the rear pylon strut includes two braces 60 secured at one of their ends to the fuselage through ball joints 56 and by their other end to anti-twist guide 62. The anti-twist guide is effective to horizontally stabilize the pylon struts while at the same time permitting each of the pylon struts to shift fore and aft about their ball joints 56. Roll actuator 64 and pitch actuator 66 are connected, as shown more clearly in FIG. 9 by one of their ends to fuselage 12. The other ends of the pitch and rolls actuators are connected to a universal joint 68 to which is connected the universal control rod 70. The upper end of control rod 70 is rigidly connected to flange 72.

Sliding sleeve 71, generally cylindrical in shape, extends upwardly through rotor hub 54 where it engages collar 44. A conduit 74 fits securely about neck 76 of flange 72 and is secured tightly thereto by clamp means 78 and 80. Conduit 74 extends down to the fuselage to a compressor (not shown) which supplies compressed fluid to the conduit. Seal 82 and bearing 84 provide a rotational fit between flange 72 and sleeve 71 whereby sleeve 71 may rotate relative to flange 72.

For a better understanding of a feature of the present invention described below reference may be had to FIGS. 2, 8 and 9. FIG. 2 is a schematic showing of a front view of the pylon in FIG. 9. Lines 46a and 48a correspond to pylon struts 46 and 48 in their normal neutral position. Line 72a represents the normal plane of orientation of flange 72. The arrow designated $T_a$ represents the direction of the rotor thrust vector with the pylon struts shown in the positions of 46a and 48a. As shown, vector $T_a$ coincides with the vertical center line of CL of the helicopter and acts perpendicular to 72a and directly through the aircraft center of gravity therebelow designated at C.G. Each of the element designations with a subscript "a" correspond to the normal positions of their counterpart structure in FIG. 9.

When actuator 64 is operated to laterally shift the lower end of control rod 70 the plane of orientation of flange 72 along with the entire rotor structure thereabove is modified. The flange 72 pivots about its rear universal ball joint 57 and may readily assume either of the two illustrative positions indicated by lines 72b or 72c or any intermediate positions therebetween dependent upon the amount of actuator travel. When the ball joint 68 is transferred to the position 68b the forward legs of the pylon assume the dashed line trapezoid designated 56, 59b, 59b, 56. It may be seen that the rotor thrust vector is thus reoriented to the direction and position indicated by the arrow $T_b$. It should be noted that not only is the direction of action of $T_b$ no longer through the airframe C.G., but a lateral shift of the entire rotor hub 54 occurs to thereby increase the amount of resultant control torque about the airframe C.G. for a given amount of change in the plane of flange 72. The dot and dash line trapezoid designated 56, 59c, 59c, 56 results from the shift of ball joint 68 to the position 68c and a redirection of the rotor thrust vector to $T_c$ is effected.

Thus, it can be understood that the pylon supporting the rotor assembly provides for the tilting of the rotor hub while simultaneously producing a shift of the thrust line off the center of the fuselage thereby augmenting the moment of the rotor thrust. The aircraft may be rolled to port or starboard by a greater amount than that which would be obtained by merely tilting the hub assembly, because of the lateral movement of the rotor assembly. It will be understood that pitch actuator 66 which controls the fore and aft pitch of the aircraft operates in a manner similar to that described in the operation of the roll actuator. Actuators 64 and 66, may, of course be operated in combination to thereby provide any desired movement of the aircraft.

Reference to FIG. 3 discloses a schematic representation of a side view of the pylon. FIG. 3 has been included to show more clearly the operation of the trim actuators 58. Thus, it can be seen that the pylon strut associated with trim actuator 58 is represented by solid line 58a. Dashed line 58b shows the change in the position of the pylon after the trim actuator alters the effective length of its associated pylon strut. Adjusting the trim actuator causes a tilt and shift similar to the one described in relation to the roll and pitch actuators. The trim actuators may be utilized when, for example, the aircraft has been loaded, or the weight has shifted, such that the center of gravity shifts from directly beneath the rotor hub, the normal position of the center of gravity and it is desirable to bring the center of gravity back to the normal position. Otherwise, the aircraft would in effect be off-balance requiring constant correction by the operator to maintain the aircraft on a steady course. The trim controls are analogous to the trim controls used in standard fixed wing aircraft.

Thus, it will be seen that the elongated tubular hub 54 together with all of the structure carried thereby forms a rotor-support means supporting the rotor assembly for rotation about its axis. The pylons 46 and 48, together with their ball joint connections 56 to the fuselage 12 and their ball joint connections 57 to the skirt 52 of the hub 54, form a mounting means which mounts the rotor-support means for movement in directions which will not only tilt the axis of the rotor assembly but which will in addition shift the axis of the rotor assembly. The rear strut 50 together with the ball joint 57 carried by its upper end form a pivot means which is operatively connected to the rotor-support means to define for the latter a pivot point which, it will be noted, is spaced from the axis of rotation of the rotor assembly, so that it is by reason of this spacing of the point, about which the rotor-support means pivots, from the axis of the rotor that the entire rotor-support means is capable of shifting as well as tilting to achieve the results of the present invention. Of course, in the illustrated example this pivot means is situated to the rear of the rotor axis.

The actuators 64 and 66 as well as the trim actuators 58 may take the form of well known hydraulic piston and cylinder assemblies, although pneumatic piston and cylinder assemblies may also be used, if desired, and these assemblies are connected through suitable unillustrated conduits with valves which can be controlled by the operator, these conduits communicating with a suitable reservoir containing pressure fluid, as is well known in the art, and of course a suitable pump or the like may also be provided for maintaining the pressure of the fluid, so that in this way the operator can control the actuators 58, 64, and 66 to produce the desired adjustments. Inasmuch as hydraulic adjusting assemblies of this type are well known in the art and do not per se form any part of the present invention, the details of this structure are omitted and the several actuators are illustrated simply in the form of cylinders.

Turning again to FIG. 8, a rotatable cylindrical sleeve 86 includes a flange portion 88 at the bottom end thereof. The sleeve 86 is supported concentrically about the sliding sleeve 71, and spaced therefrom by the annular sleeve bearing seals 90 which are held in place by lock rings 92. A collar 94, is rigidly secured to the upper end of sleeve 86. Depending outwardly from collar 94 and securely connected thereto are opposed rotor supporting trunnions 96. The concentric tubular spacers 98 and 100 cooperate to maintain the rotor support bearings 104, 104 in spaced apart relation to allow the rotor hub 54 to remain stationary with respect to elements 98, 94, 86 and 71, which rotate in conjunction with the spinning rotor blades. It should be noted that sleeve 71 may slide up and down within sleeve bearings 90 relative to sleeve 86. However, sleeve 71 also rotates with sleeve 86 because pitch levers 42 connected to collar 44, and in turn secured to sleeve 71 are rotated by the rotor blades through pitch rods 40, pitch horns 36 and 38, and pitch shafts 30 and 31. It is essential that these parts rotate because collar 44 connects passageway 106 to the passageway formed by conduit 74. Collar 44 is fixedly secured to conduits 108 by ring clamps 110. Conduits 108 in turn are connected at their outer ends to the rotor blades 18 and 20 which contain passageways 112 to direct compressed fluid to jet nozzles (not shown) at the ends of the rotor blades. Thus, a continuous passage is provided for fluid from a compressor (not shown) to the nozzle (not shown), thereby allowing the fluid to be compressed and passed to the jet nozzles to be expended therethrough, thereby driving the rotor blades.

Returning now to FIG. 9, a collective pitch control handle 114 is connected via the linkage arms 116, 118, 120 and 122 to universal joint 68. Joints 124–130 provide suitable connecting links between the arms. Adjustment of the control handle will move universal control rod 70 up or down according to the need of the operator to vary the collective pitch of the rotor. As explained previously, the universal control rod 70 is connected to sleeve 71 and ultimately to the rotor blades 18 and 20. The control system described allows the operator to adjust the pitch of the rotor blades to provide more or less "bite" in the blades. The adjustment of the collective pitch of the blades provides for the vertical movement, either up or down of the aircraft, as is well known in the art.

FIGS. 7 and 9 disclose the connection of the leaf springs, rotor blades, conduits, and associated elements. Thus, leaf springs 22 and 24, consisting of a plurality of metallic sheets laminated together and securely connected at their ends to rotor blades 18 and 20 by upper and lower clamping plates 132 and 134 fastened together by bolts 136. A pair of rectangular plates 138 and 140 are positioned intermediate the length of the leaf springs. Plates 138 and 140 include centrally located clearance apertures 141 through which rotor hub 54 freely extends. The leaf springs extend between plates 138 and 140, said plates and leaf springs being fastened together by bolts 142. The lower plate 140 includes substantially triangular sections 144, 144 depending downwardly from opposite ends thereof. At the bottom or apex of sections 144 apertures 146 are provided to engage extension fingers 148 of pitch shafts 30 and 31. Fingers 148 freely rotate and may slide within apertures 146. Triangular sections 144, in cooperation with faces 150 of pitch shafts 30 and 31 cooperate to act as a stop when the rotor blades cease turning and subsequently droop. Thus, when the blades stop, the drooping motion is transferred to the pitch shafts and move them inwardly until the faces 150, abut the suface of triangular section 144, thereby preventing further inward movement and supporting the blades.

The rotor blades are hingedly connected to the main rotor axle via the top plate 138 which includes see-saw hinges 152. The see-saw hinges are shaped substantially in the form of a triangle with the base portion fixed to the upper plate 138. Apertures 154, bored through the hinges near the apex thereof provide for a rotatable fit therein of trunnions 96 extending outwardly from the hub or collar 94.

It can be understood from the foregoing, therefore, that the present invention represents a significant advance in the rotary aircraft art. The present invention eliminates the need for a relatively expensive and complicated swash plate which is expensive to manufacture and difficult to maintain in operating condition. The tilt control of this invention obviates the requirement for cyclic control, that is, the maintenance of a proper pitch relationship between the advancing and the retreating blades to thereby provide proper balance of the aircraft. In the prior art where a predetermined pitch relationship between the advancing and retreating rotor blades was required to be maintained at all times, each rotor blade was at some degree of pitch at all times. When a horizontal or vertical movement of the aircraft was required a collective pitch had to be applied to the blades in addition to the pitch required by the cyclic control. By eliminating the need for cyclic control greater latitude of pitch movement is obtained because instead of having, in effect, two degrees of pitch being applied simultaneously to the blade when the aircraft is ascending or descending, only one degree of pitch need be applied. Thus, it can be understood that tilt control supplies definite advantages over cyclic control.

Furthermore, as explained above, this invention provides for a greater latitude in the control of the tilt movement through the utilization of the pylon assembly and associated actuators and elements, as described which allows the entire rotor assembly to shift laterally with respect to the fuselage, thereby producing a further shift in the thrust vector to accentuate the control that the operator may exercise in directing the aircraft in the various movements desired.

I have described what I believe to be the best embodiments of my invention. I do not wish, however, to be confined to the embodiments shown, for what I desire to cover by Letters Patent as set forth in the following claims.

What is claimed is:

1. In a tilt control rotary wing aircraft, a fuselage, a rotor assembly situated over said fuselage and having a rotor axis about which said assembly rotates, rotor-support means supporting said rotor assembly for rotation about said axis, mounting means operatively connected to said fuselage and to said rotor-support means to mount the latter for tilting and shifting movement so as to provide tilting and shifting movement of said rotor axis, pivot means operatively connected to said fuselage and to said rotor-support means and defining for said rotor-support means a pivot point spaced from said rotor axis and about which said rotor support means pivots during tilting and shifting of said rotor axis and said rotor-support means therewith, and means operatively connected to said rotor-support means for moving the latter with respect to said pivot means for changing the orientation of said rotor axis with respect to said fuselage.

2. In an aircraft as recited in claim 1, said mounting means including a plurality of elongated pylons and ball joints connecting said pylons on the one hand to said rotor-support means and on the other hand to said fuselage.

3. In an aircraft as recited in claim 1, said rotor assembly including rotor blades and leaf springs connecting said blades to said rotor-support means.

4. In an aircraft as recited in claim 1, said means for moving said rotor-support means with respect to said pivot means including an elongated rod extending from said rotor-support means and having a free end distant from said rotor-support means and located adjacent said fuselage, a universal joint connected to said free end of said rod, and a pair of actuators connected to said fuselage and to said universal joint, said actuators respectively extending transversely and longitudinally of said fuselage for controlling the direction of movement of said rotor-support means with respect to said pivot means.

5. In an aircraft as recited in claim 1, said mounting means including elongated pylons connected on the one hand to said rotor-support means and on the other hand to said fuselage, and a plurality of trim actuators respectively connected operatively to said pylons for controlling the length thereof.

6. In an aircraft as recited in claim 1, said rotor-support means including an elongated tubular hub, an elongated inner sleeve and an elongated outer sleeve coaxially surrounding said inner sleeve and extending coaxially along the interior of said hub and supported thereby for rotation about the common axis of said hub and sleeve, said common axis coinciding with the rotor axis, a hinge assembly carried by said outer sleeve, rotor blades carried by said hinge assembly and forming with the latter part of said rotor assembly, said mounting means including a plurality of elongated struts and ball joints connecting said struts pivotally on the one hand to said hub and on the other hand to said fuselage, said pivot means including a ball joint fixed to said hub to the rear of said rotor axis and an additional strut connecting said latter ball joint to said fuselage, said means for moving said rotor-support means with respect to said pivot means including a flange rotatably connected to said inner sleeve, an elongated rod fixed to said flange and extending therefrom toward said fuselage, and actuators operatively connected to said rod for moving the latter and said flange and sleeve therewith so as to move said hub with respect to said pivot means.

References Cited by the Examiner

UNITED STATES PATENTS

| | | | |
|---|---|---|---|
| Re. 23,448 | 12/1951 | Pullin | 170—160.27 X |
| 2,163,728 | 6/1939 | Dyer | 170—160.27 X |
| 2,569,882 | 10/1951 | Bothezat. | |
| 2,601,258 | 6/1952 | Brzozowski | 170—160.27 X |
| 2,644,533 | 7/1953 | Maillard | 170—135.4 X |
| 2,724,446 | 11/1955 | Hill | 170—160.27 X |
| 2,741,320 | 4/1956 | Ruhle | 170—160.27 X |
| 2,830,669 | 4/1958 | Klockner | 170—160.42 |
| 2,925,129 | 2/1960 | Yuan | 170—135.4 |
| 3,052,305 | 9/1962 | Jones et al. | 170—160.53 X |
| 3,073,394 | 1/1963 | Laufer | 170—135.4 |
| 3,118,504 | 1/1964 | Cresap | 170—160.26 X |
| 3,144,907 | 8/1964 | Lubben et al. | 170—160.25 |
| 3,149,802 | 9/1964 | Wigal. | |

FOREIGN PATENTS 752,220   7/1956   Great Britain.

OTHER REFERENCES

Aircraft Engineering: vol. 22, No. 260, October 1950, pages 292–295 relied on.

SAMUEL LEVINE, *Primary Examiner.*

JULIUS E. WEST, *Examiner.*